UNITED STATES PATENT OFFICE.

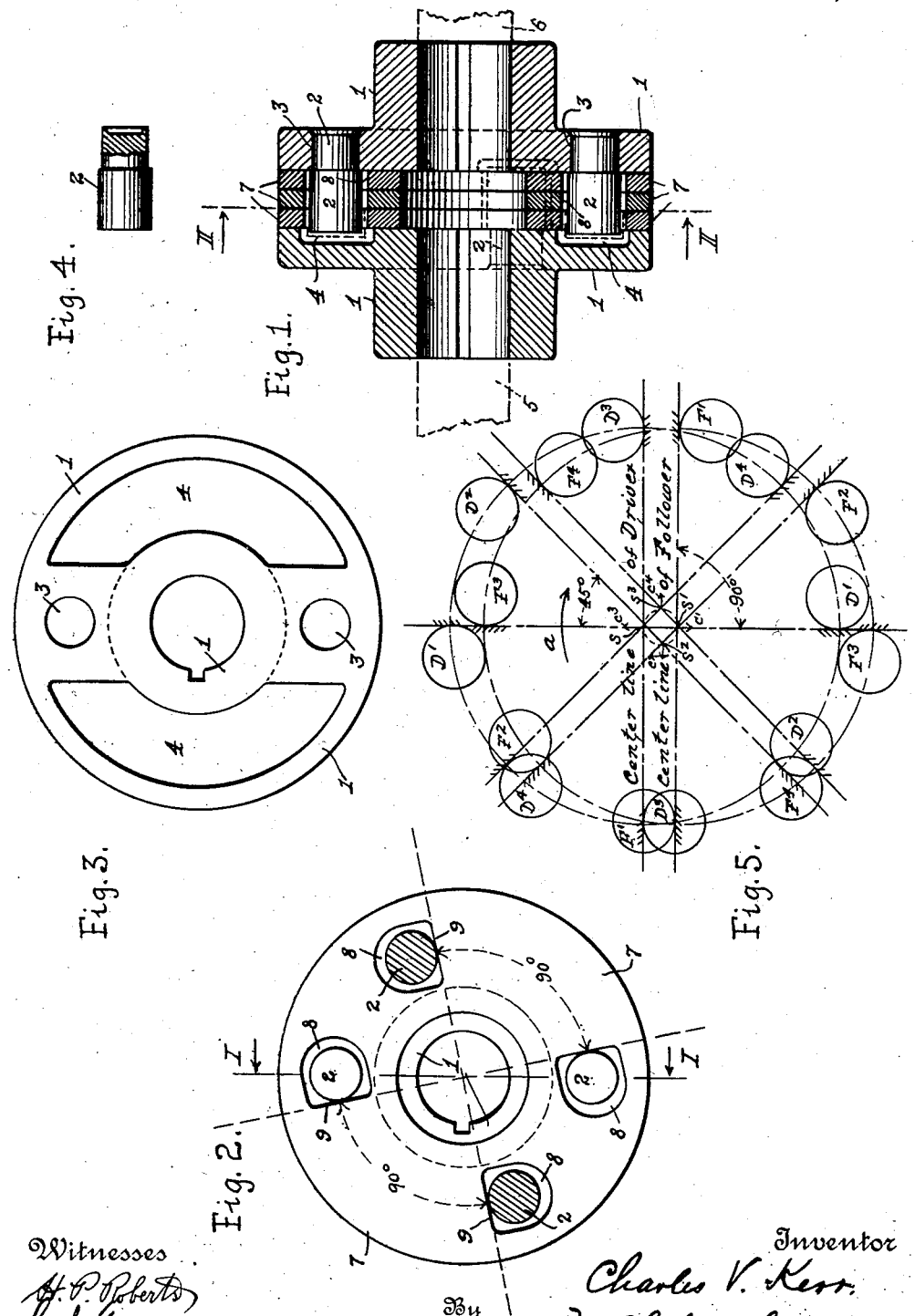

CHARLES VOLNEY KERR, OF WELLSVILLE, NEW YORK.

FLEXIBLE COUPLING.

1,159,774.    Specification of Letters Patent.    Patented Nov. 9, 1915.

Application filed September 6, 1913. Serial No. 788,436.

*To all whom it may concern:*

Be it known that I, CHARLES VOLNEY KERR, a citizen of the United States, residing at Wellsville, in the county of Allegany and State of New York, have invented certain new and useful Improvements in Flexible Couplings, of which the following is a specification.

My invention relates to a flexible coupling for shafts which is particularly adapted for high speed work, and the objects of the invention are, first, to construct and arrange the parts of the coupling so that owing to any changes or inaccuracies in alinement, variations of temperature in one or both machines connected by the coupling, the efficiency of the shafting will not be altered or destroyed; second, to construct and arrange the parts as to form a coupling having a smooth exterior surface, thereby preventing any possibility of an operator being caught by and drawn into the rapidly moving coupling; third, to so construct the parts of the coupling that there are provided two pairs of contact points arranged at right angles to each other, which permit movement in the direction of one pair without parting contact at the other pair; fourth, to arrange the parts of the coupling so that the driving is done by a couple, thereby preventing any pressure between the bearings; fifth, to provide a flexible coupling having one or more hard fiber floating rings or disks, which enable the coupling to operate with the connected shafts out of line as well as offset, and at the same time adapt it for use as an insulating coupling for electric generators or motors; sixth, to construct and arrange a coupling so that when the same is rapidly rotated, the centrifugal force of the connecting and floating ring or disk is always in such a direction as to hold the said ring or disk in contact with the bearing points or pins of the coupling; and seventh, to construct a flexible coupling which will have all the functions above indicated and at the same time will comprise the least number of parts, be inexpensive to manufacture, easily assembled or taken apart, and require the minimum amount of repairs.

The invention consists of structural features and relative arrangements of elements which will be hereinafter more fully described and particularly pointed out in the appended claims.

Referring to the drawings in which similar reference characters indicate the same parts in the several figures of the drawing: Figure 1 is a longitudinal central section of my coupling on line I—I of Fig. 2; Fig. 2 is a section on line II—II of Fig. 1; Fig. 3 is an end view of one of the flanges detached from the coupling, with the driving pins removed; Fig. 4 is a side view of one of the driving pins, partly broken away; and Fig. 5 is a displacement diagram indicating the different positions of the driving and driven parts of the coupling through its phases of rotary movement.

Referring to the drawings, the coupling as shown in Fig. 1 consists of two rotatable members or flanges 1, 1, of cast iron or other suitable material made exactly alike to which the shaft sections 5 and 6, shown in dotted lines, are connected, and each member or flange 1, 1, is provided with two driving pins 2, 2, riveted as shown, or securely fastened by means of a nut and thread, or other means, to permit quick removal of said pins from the holes 3, 3. Said pins 2, 2, are placed on said flanges 1, 1, at equal distances from the center and on a diameter of the flange. The rotary members or flanges 1, 1, are also provided preferably with lunate shaped recesses 4 on their inner sides, for the purpose of receiving the inner or free ends of the pins 2, 2, thereby permitting a small longitudinal movement of said flanges 1, 1, toward each other with the attached shaft sections 5 and 6. Between the inner surfaces of the two rotary members or flanges 1, 1, and engaged by the pins 2, on said flanges, are placed one or more separated and independent floating rings or disks 7, having openings 8, 8, so arranged that the bearing surfaces or faces 9, 9, in the disks 7, 7, for the two pairs of pins 2, 2, are on diameters of the rings or disks at right angles to each other, and with the contact or bearing surfaces 9, 9, radially disposed to receive the pressure of the pins 2, 2, as shown clearly in Fig. 2. Said floating rings or disks 7, 7, may be made of metal or other material, but are preferably made of fiber, which has a specific gravity of about one-fifth that of cast iron, with equal tensile strength, and a bearing strength equal to soft steel; also not affected by acid or oil, and acts as an insulator when the invention is used in coupling an electric generator or motor with some other apparatus.

The operation of the invention is as follows: Assuming the center lines of the driving shaft and the driven shaft are separated or displaced a distance equal to line $s$, $s'$, indicated in the diagram shown in Fig. 5. The first position of the driving pins when rotated in the direction indicated by the arrow $a$ will be $D'$, $D'$ and that of the driven or follower pins will be $F'$, $F'$, and the center of the floating ring or disk is at $S'$ with the diameters connecting the bearing faces of the driving and driven pins at right angles. If the driving pins move through forty-five degrees to the position indicated by $D^2$, $D^2$ the driven pins are in the position indicated by $F^2$, $F^2$, and the center of the floating disk or ring moves through ninety degrees to $S^2$, and if the pair of driving pins is turned through ninety degrees to the position indicated by $D^3$, $D^3$, the driven pins are at $F^3$, $F^3$, and the center of the floating ring or disk has moved from $S^2$ to $S$ or one-hundred and eighty degrees or one-half a revolution. When the driving pins are at $D^4$, $D^4$, the driven or follower pins are at $F^4$, $F^4$ and the center of the floating ring or disk is at $S^3$, and upon further rotation, and through an angle of one hundred and eighty degrees, of the driving pins, they will come into the position indicated by $D'$, $D'$, with the driving pin which was at the bottom of the coupling at the top, and vice versa, and the center of the floating disk or ring will be again at $S'$, said center having made a complete rotation or through three hundred and sixty degrees of a circle, whose diameter is the line $s$, $s'$, and equal to the distance which the centers of the shafts are displaced or out of line.

Thus it will be seen from the foregoing description and operation of the invention, and as fully shown in the displacement diagram of Fig. 5, the rotation of the center of the floating disk or ring about a circle whose diameter is the shaft displacement is twice the rotation of the flanges or rotatable members and the connected shaft sections, and this rotation sets up a radial centrifugal force, as indicated by the arrows $c'$, $c^2$, $c^3$ and $c^4$, which tends always to slide the floating disks or rings into position and hold them there, to be properly and efficiently engaged by the driving and driven pins of the rotatable members.

It will be seen from the herein described structural characteristics and relative arrangements of the elements comprising my invention, that I have devised a flexible coupling in which all the advantages and objects of the invention set forth in the introductory statement of invention are fully and efficiently carried out, and the coupling is readily adaptable when the shaft sections are not parallel, and permits free endwise movement of the rotating parts of driven or driving machines, and at the same time no side thrust is put on the bearings of the shaft sections, a most important feature and advantage over prior couplings of this character. Furthermore, the herein described coupling is well adapted for transmitting power between shafts which are greatly out of line, or connecting a series of lengths of line shafting, where settling of floors or other supports for shaft bearings would throw said shaft sections badly out of line and cause a great loss of power.

What I claim is:—

1. A flexible coupling for shafts comprising two separated members or flanges, a pair of pins projecting from each of said members and parallel with the axis of rotation thereof, said pins being arranged diametrically opposite each other, and a floating ring or disk loosely interposed between said separated rotatable members or flanges and provided with two pairs of holes arranged diametrically opposite to each other, each of said holes having a radial bearing face at right angles to the bearing face of the adjacent hole and engaged by a pin projecting from one of the rotatable members and into said hole.

2. A flexible coupling for shafts comprising two separated rotatable members or flanges, a pair of pins projecting from each of said members, and parallel with the axis of rotation thereof, said pins being arranged diametrically opposite each other, and a plurality of floating rings or disks loosely interposed between said separated rotatable members or flanges and each provided with two pairs of holes arranged diametrically opposite to each other, each of said holes having a radial bearing face at right angles to the bearing face of the adjacent hole and engaged by a pin projecting from one of the rotatable members and into said hole.

In testimony whereof I affix my signature in presence of two witnesses.

CHARLES VOLNEY KERR.

Witnesses:
 VOLNEY A. KERR,
 VIDA APPLEBEE KERR.